Dec. 30, 1930.　　　　R. W. DULL　　　　1,786,707
APPARATUS FOR CHAIN MANUFACTURE
Filed May 7, 1924　　　5 Sheets-Sheet 2

Inventor.
Raymond W. Dull.
by Parker & Carter
Attorneys.

Dec. 30, 1930. R. W. DULL 1,786,707
APPARATUS FOR CHAIN MANUFACTURE
Filed May 7, 1924 5 Sheets-Sheet 3

Inventor
Raymond W. Dull
by Parker & Carter
Attorneys

Inventor.
Raymond W. Dull.
by Parker & Carter
Attorneys.

Patented Dec. 30, 1930

1,786,707

UNITED STATES PATENT OFFICE

RAYMOND W. DULL, OF CHICAGO, ILLINOIS, ASSIGNOR TO LINK-BELT COMPANY, OF CHICAGO, ILLINOIS, A CORPORATION OF ILLINOIS

APPARATUS FOR CHAIN MANUFACTURE

Application filed May 7, 1924. Serial No. 711,534.

My invention relates to an apparatus for making chain from a strip of sheet metal stock, and particularly to a machine for the continuous making and automatic assembling of the links into a chain. The general object of my invention is to produce chain of the type described in which hook and pintle tongues are stamped from the center of the link blank and the hook and pintle end bars are bent to produce a chain, each link of which consists of flat side bars, a relatively cylindrical hook at one end, and a pintle at the other shaped for rotation within the hook of the link next adjacent. One object is to provide a mechanism for producing chain of the type described, with maximum cheapness and simplicity. Another object is to provide a mechanism which shall stamp the hook and pintle tongues from the center of the blank and curl them and the end bars into finished hooks and pintles with a minimum strain upon the metal of the blank, and a minimum weakening and distortion of the fibers of the metal. Another object is to provide a mechanism for producing chain of the type described in which, by scoring and by indenting each blank the tendency of the end bars to tear out shall be reduced to a minimum. Another object is to provide a mechanism for producing chain of the described type in which the length of the blank as it passes through the device shall vary as little as possible during, and be reduced as little as possible, by the successive die impacts.

Other objects will appear from time to time in the course of the specification and claims.

I illustrate my invention more or less diagrammatically in the accompanying drawings, wherein—

Like parts are illustrated by like characters throughout the specification and drawings.

A is any suitable base having mounted thereupon the die block $A^1$, which may be secured thereto, for example, by the wedge $A^2$, downwardly drawn by the bolts $A^3$, and engaging with its inclined overhanging wall $A^4$ the opposite inclined wall $A^5$ of the block. The opposite side of the block is gripped by the overhanging inclined wall $A^6$ of the base.

B is any suitable strip of relatively resistant material upon which rest the individual die elements. These elements are gripped and aligned in any suitable manner, for example by the opposed holding blocks $B^1$, $B^2$, which may be connected together, for example by the bolts $B^3$. The individual die elements will later be discussed in detail.

Figures 4, 11, 12:
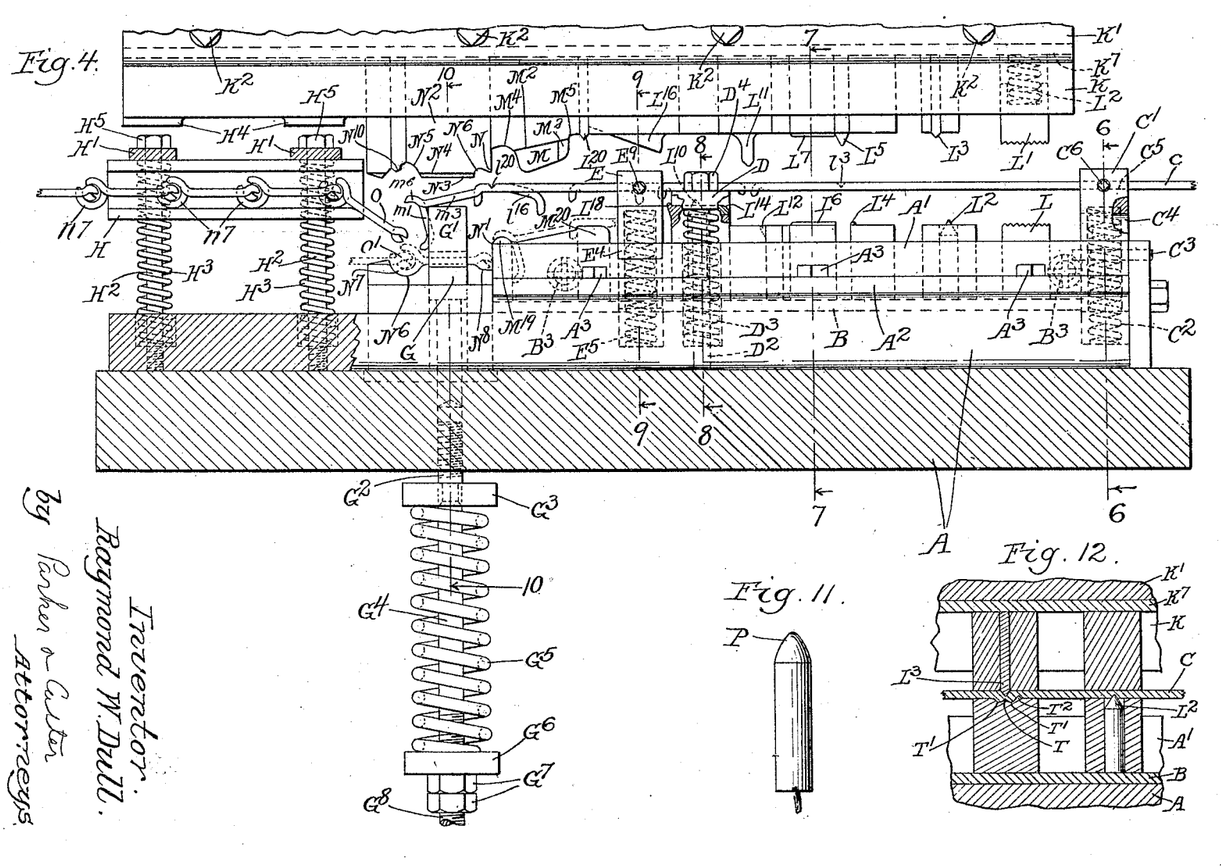
Figure 4 is a skeleton side elevation of the punch and die, illustrating the passage of the stock therethrough, and its formation into links.
Figure 11 is a view of an alternative form of prick punch.
Figure 12 is a longitudinal vertical section through a slightly modified form of punch and die.
Figure 6:
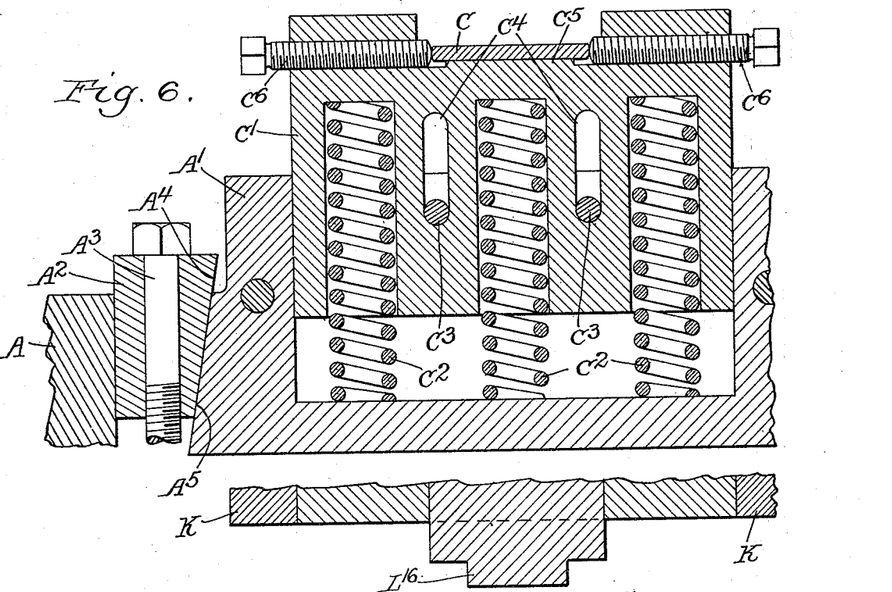
Figure 6 is a section on the line 6—6 of Figure 4.
Figure 7:
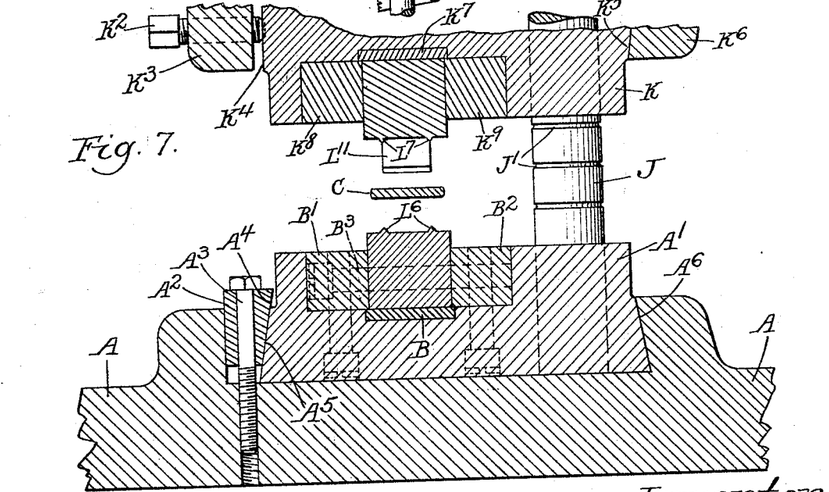
Figure 7 is a section on the line 7—7 of Figure 4.

The passage of the metal strip C over the die block is from right to left, as shown in Figure 4. This ribbon or strip of stock C may be initially straightened and fed by any means not herein shown, being guided into the machine, for example by the yieldingly mounted supporting block $C^1$ which is mounted to reciprocate vertically in the die block $A^1$, being supported, for example by the spiral springs $C^2$. Its vertical movement is limited, for example, by the pins $C^3$ and the slots $C^4$. $C^5$ is a centrally disposed flat bearing surface adapted to receive the bottom of the strip C and upon which the strip may be centered, for example by the opposed set screws $C^6$, $C^6$ which may be adjusted to adjust the strip C laterally. The above described parts are shown in some detail in Figure 6.

Figure 8:
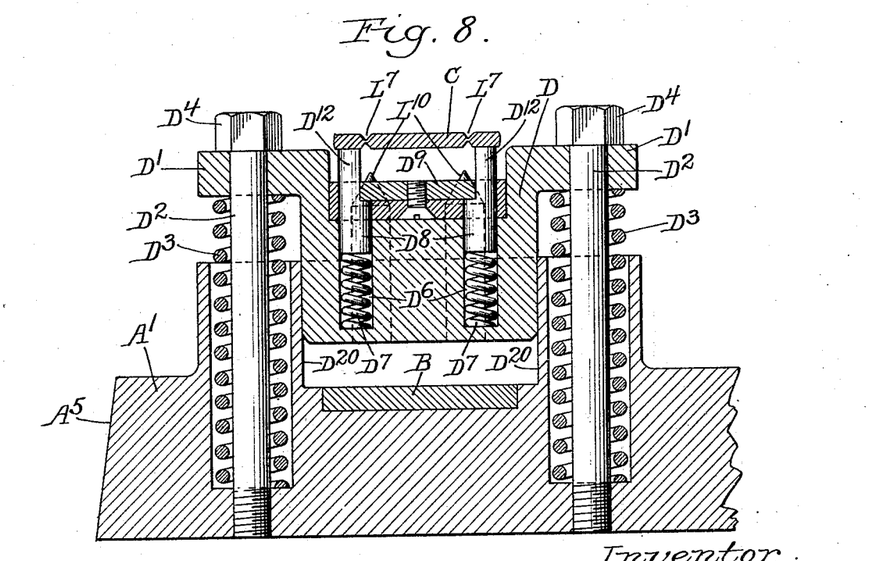
Figure 8 is a section on the line 8—8 of Figures 4 and 5.
Figure 9:
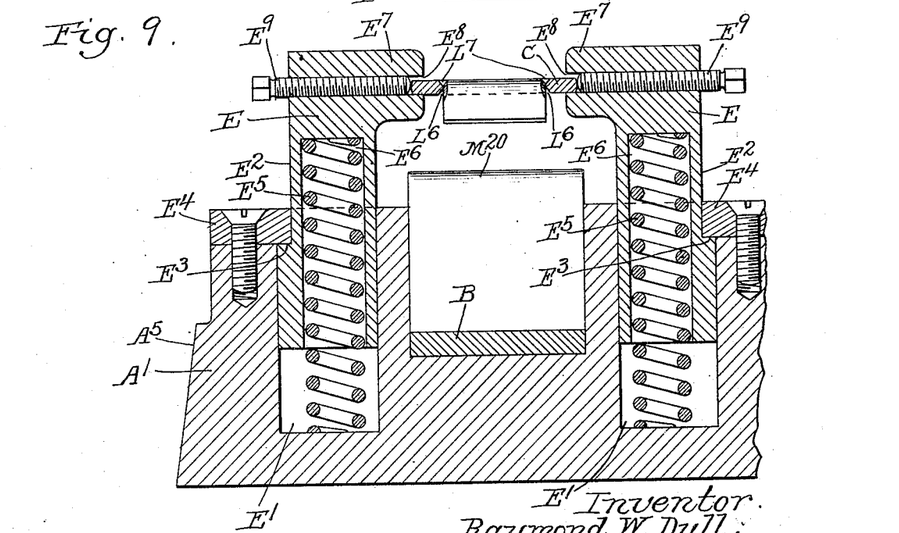
Figure 9 is a section on the line 9—9 of Figure 4.
Figure 10:
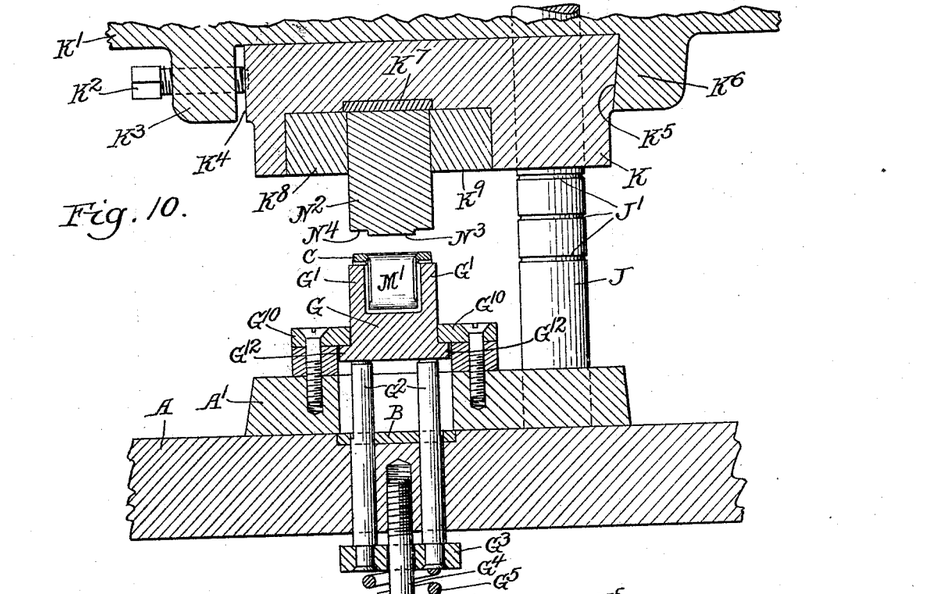
Figure 10 is a section on the line 10—10 of Figure 4.

D is a second strip or stock supporting yoke or block having the outer projecting lugs or ears $D^1$, $D^1$ slidable along vertical pins $D^2$, $D^2$ and upwardly pressed by the spiral springs $D^3$, $D^3$ against the heads $D^4$, $D^4$ of the pins. The depending portion is further guided by the surfaces $D^{20}$, $D^{20}$ of the sides of the block, the block being cut away to permit the downward movement of the yoke D. The yoke portion is penetrated by vertical cylindrical apertures $D^6$, $D^6$ in the bottoms of which are coiled springs $D^7$, $D^7$ which press the pins $D^8$, $D^8$ upwardly to the position shown in Figure 8, the pins being notched, the reduced portions $D^{12}$ projecting upwardly through the stock engaging element $D^9$, the circular portion of each pin serving as a stop to limit upward movement of the pin. $L^{10}$, $L^{10}$ are conical prick punch elements mounted on the yoke D, the purpose of which will be later described.

Figure 5:
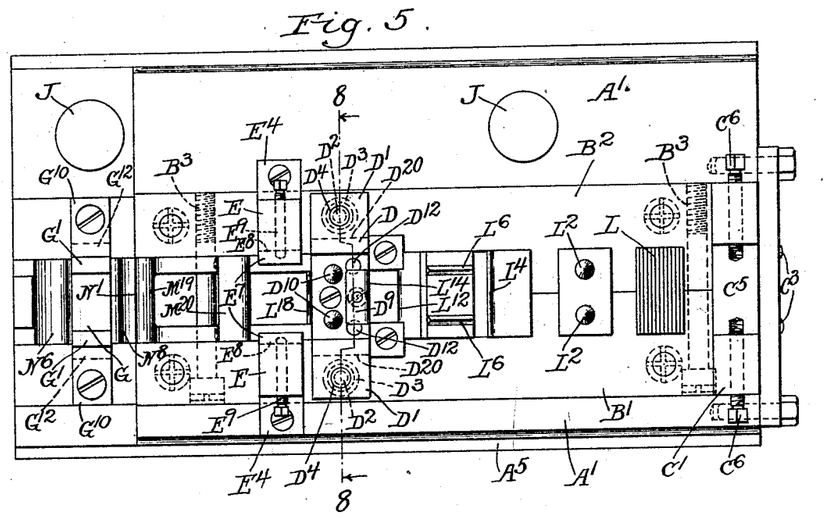
Figure 5 is a plan view of the die.

Positioned to the left of the support D, as shown in Figures 4 and 5 are a plurality of opposed strip or stock guiding elements E, E adapted to reciprocate in the apertures $E^1$, $E^1$ in the block $A^1$. The lower portion of each serves as a plunger, the upper portion being reduced as at $E^2$ to form a shoulder or ledge $E^3$, which engages the stop $E^4$ which limits the upward movement of each guiding element. They are normally maintained in a position of maximum elevation by the coiled springs $E^5$, which penetrate the cylindrical apertures $E^6$ in the guide elements. The upper ends of the guide elements are laterally inwardly extended, as at $E^7$ and provided with a slot therealong, $E^8$, through which the edge of the stock or strip passes. It may be centered or adjusted laterally between the two guides, for example by means of the set screws $E^9$.

G is a stock engaging element having a pair of upwardly projecting longitudinally extending lugs $G^1$, $G^1$, adapted to engage the side bars of the link blank. It rests upon the tops of the plungers $G^2$, $G^2$ the lower extremities of which are fixed in a yoke $G^3$ slidable along the pin $G^4$. $G^5$ is a spiral spring compressed between the yoke $G^3$ and the stop $G^6$ adjacent the lower extremity of the pin. $G^7$, $G^7$ are adjusting nuts screw threaded upon the lower portion $G^8$ of the pin. Any suitable means for limiting the upward travel of the element G may be provided, for example, the stops $G^{10}$ adapted to engage the outwardly projecting flanges $G^{12}$ upon the element G. Mounted still farther to the left, as shown in Figure 4, are a pair of opposed channel iron guides H, H adapted to engage the opposite sides of the chain links, means being provided for drawing them forwardly therealong, said means not being shown herein, and forming no part of the invention claimed in the present application. The channels H are connected, for example, by cross pieces $H^1$, $H^1$, the ends of which are perforated to slide upon the pairs of vertical guides $H^2$, $H^2$ and are kept normally in raised position, as shown in Figure 4, for example by the spiral springs $H^3$, $H^3$. The cross pieces may be engaged, for example, by any suitable elements $H^4$, $H^4$ on the punch element, the elements $H^4$, being out of alignment with the fixed pins $H^2$. The heads $H^5$ of said pins serve as stops to limit the upward movement of the cross pieces $H^1$ and the channel guides H in response to the springs $H^3$.

The chain is formed by the passage between the opposed die and punch elements of a strip of stock which is moved forwardly therebetween, by a step by step movement by any suitable feeding means, the details of which need not be shown herein. At each successive forward movement the punch element is moved downwardly against the die element by any suitable press mechanism. The punch and die are aligned, for example, by the vertical guiding columns J, J in rigid relation with the die block $A^1$ and upon which the punch block K, K is slidably mounted, $J^1$ being any suitable lubricating passages. The punch block K is clamped into any suitable working backing $K^1$, for example by the set screws $K^2$ of the punch block. The opposite side $K^5$ of the punch block is engaged by the over-hanging surfaced lug $K^6$. $K^7$ is a backing or base element similar to the backing or base element B of the die block, and $K^8$, $K^9$ are clamping elements similar to $B^1$, $B^2$ and are similarly secured together about the individual punch elements. Since the separate punch and die elements operate in pairs upon the strip of metal passing step by step therebetween, they will be described in pairs, and in relation to the impression they make upon the stock. As the stock C is passed forwardly through the guide $C^1$ it is first engaged by opposed indented or striated gripping pads L, $L^1$, L being fixed in relation to the die block $A^1$, $L^1$ being yieldingly mounted in the punch block K, and being held in normally downwardly extended position, for example, by the spiral spring $L^{22}$. The function of the opposed pads is to grip the stock and prevent lateral movement thereof during and in response to the successive forming impacts, their action being particularly important when the strip is first fed through between the punch and die and before its end has reached the opposite end of the die. The pads may be of metal, or of any suitable fibrous or frictional material. At each forward step or movement, that part of the stock which has just been gripped by the pads L, L¹ is moved forwardly a predetermined length, the length of one chain link blank, and is then subjected to the action of a pair of prick punches L², L² on the die, and a transverse scoring knife L³ on the punch. The prick punch elements are so positioned as to indent the inner corners of the junctions between the side bars and the pintle end bar, on the lower side of the stock along the line of future division between the tongues which will ultimately be separated from the side bars to form the hook and pintle of the completed link.

Whereas I prefer to use sharp pointed prick punches, it will be understood that under some circumstances a rounded or ball tipped punch or indenting instrument can be substituted which will have the same function and perform the same service. The alternative type of prick punch is illustrated as P in Figure 11.

Figures 1, 2:
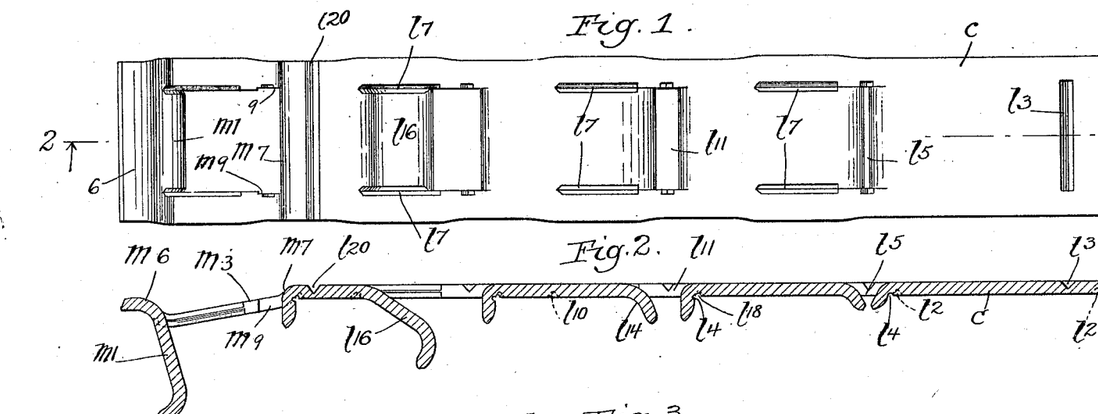
Figure 1 is a plan view of the strip of material operated upon, illustrating the effect of the successive die impacts.
Figure 2 is a section along the line 2—2 of Figure 1.

At the next forward movement of the stock, the blank or future link is so positioned that the transverse severing knife L⁵ overlies the score $l^8$ and severs the metal therealong, cutting apart the edges of the opposed hook and pintle tongues, bending the pintle tongue downwardly about the bead L⁴ and slightly bending the end of the hook tongue and beginning its separation from the side bars, as shown in Figure 2.

Figure 3:
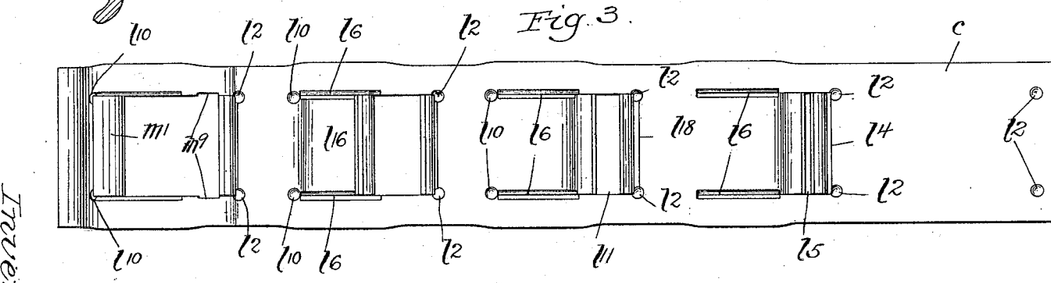
Figure 3 is a plan view similar to Figure 1, but showing the under side of the stock.

Meanwhile the opposed pairs of longitudinal scoring knives L⁶, L⁷ score or outline the unsevered or uncut edge of the hook tongue on the top and bottom of the stock respectively, as shown at $l^7$ in Figure 1 and $l^6$ in Figure 3.

At the next forward movement of the stock it passes above the yielding block D, above described, and the bottom of the stock is punched by the prick punch elements L¹⁰ thereupon, the prick punch marks coming at the ends of the bottom longitudinal scores $l^6$ and indicating the inner corners of the junction between the side bars and the hook end bar of the link. The punch marks serve to prevent tearing out of the stock when the hook tongue is severed from the side bars along the longitudinal scores $l^6$, $l^7$.

The knife L¹¹ further bends the ends of the pintle and hook tongues, the end of the pintle tongue being bent about the beading L¹² and the end of the hook tongue being rolled about the rounded corner L¹⁴ of the yieldingly mounted block D. The hook tongue is thereby separated from the side bars along part of the length of the longitudinal scores $l^6$, $l^7$.

At the next forward movement of the stock the punch element L¹⁶ completes the separation of the hook tongue from the side bars, moving it to the position shown at $l^{16}$ in Figure 2, the punch marks $l^{10}$ preventing tearing away of the hook tongue at the corners. Meanwhile the transverse scoring knife L²⁰ deeply scores the top of the stock, outlining the separation between adjacent links, and the end of the punch element L¹⁶ further slightly bends the pintle tongue about the transverse bead L¹⁸, along the left edge of the block D, as shown in Figure 4.

At the next forward movement of the stock the punch element M which has substantially the cross section of the central aperture of the link, punches out or moves the hook tongue to the position shown at $m^1$ in Figure 2. Along the base of the punch M are the inclined punch ledges M² adapted to engage the side bars of the link and bend them into the position shown at $m^3$ in Figure 2. The rounded ends M⁴, M⁵ of the base of the punch block M, operating against corresponding die elements M¹⁹, M²⁰ bend the hook and pintle end bars respectively of the link to the form shown at $m^6$, $m^7$ in Figure 2.

The punch M near the pintle end is slightly wider, as at M⁹ than the central aperture of the link, and chisels out a part of the aperture to allow freedom for the hook in the finished chain.

Finally at the next movement of the stock the cutting edge N, formed by a downward off-setting of the punch, shears along the score $l^{20}$ and against the opposed cutting edge N¹ of the die, and severs the partly completed link from the stock. As the stock is forced down by the punch, prior to the severing, the side bars of the link are engaged by the longitudinal lugs G¹ of the yieldingly mounted block G, and are locked thereby against the punch element N², which is provided with a central portion N³ penetrating within the central aperture of the link, and side bearing surfaces N⁴ in opposition to the tops of the lugs G¹. The severed link is thus firmly gripped, the spring G⁵ serving to compress the block G and the lugs G¹ against the link, and to lock the link against the punch N².

The curved portions N⁵, N⁶ of the punch N² engage respectively the bent hook and pintle end bars. As the link is carried downwardly by the punch, the end of the hook tongue engages the rolling die surface N⁶ and is curved thereby into the position N⁷, as shown in Figure 4. Prior to the completion of this rolling movement the pintle tongue contacts the die surface N⁸ and is bent into the position shown in Figure 4. The rolling movement of the hook tongue is limited by the stop N¹⁰ adjacent the surface N⁵ of the punch element N².

Meanwhile the previously completed links of the chain are passing forwardly between the guides H, the forward feed of the chain being so adjusted that as each hook tongue is rolled into the position shown at N⁷, the pintle tongue and pintle bar of the precedingly formed link is held in the position shown at O in Figure 4. The hook tongue curls around and incloses it, thus fastening the newly formed link to the end of the completed chain, as shown in dotted lines at O¹ in Figure 4.

The guides H and the completed chain travelling therethrough are normally maintained in general alignment, as in Figure 4, with the stock as it passes through the yieldingly supported guide elements C¹ and E. As the stock is depressed by the action of the punch elements thereupon, the punch also contacts the cross elements H¹, and depresses the finished chain, maintaining it in alignment with the stock as it descends and with the descending severed link as it continues its descent following severance from the stock. As the hook tongue of the link begins to curl, as at N⁷, the pintle bar of the finished link is dropped into position in the bend of the hook tongue and is thus surrounded by it as the hook tongue is rolled into final position. At the next forward movement of the stock and the completed chain, the completed link is drawn forward with the completed pintle bar, ready for the attachment of the next succeeding link thereto.

In the modification shown in Figure 12, the initial scoring knife L³ is shown as in Figure 4. It has opposed to it a smaller scoring knife T which is just sufficient to cut the skin or surface of the metal of the underside of the strip C. In order to prevent compression of the metal and consequent breaking down and weakening of its structure, I provide at each side of the scoring knife T the depressions T¹, T¹. The scoring or creasing knife T² serves to crease the bottom of the stock along the inside of the bend of the future pintle tongue. The prick punch elements L² are shown as moved forward one step to occupy the position of the pad L in Figure 4 and the pad L may be moved forward, or may, if desired, be dispensed with.

The use and operation of my invention are as follows:

I manufacture chain from a ribbon or strip of sheet metal stock which is fed forwardly step by step between opposed punches and dies. The interval between the forward feeding movement need be only sufficient to permit the strip to move forwardly through the press the length of one link.

In order to prevent interference between the stock and the punch or die, at the time of such forward movement, I provide means for lifting the entire strip of stock from the die between the forming impacts of punch upon die. In the form herein shown, I move the strip upwardly, after each impact, to a position substantially midway between punch and die when the punch is withdrawn to its maximum height. In the illustrated mechanism, I accomplish this result by feeding the strip forwardly through yieldingly mounted guides which are adapted normally to support the stock a predetermined distance above the dies, but which permit it to descend, and descend with it, in response to the action of the punch. As the punch descends, it forces the strip and with it the strip guides downwardly toward the die block, and as soon as the punch withdraws, the guides rise and carry the strip with them.

The yieldingly mounted block or support D has an upward excursion in response to its coiled springs D³ sufficient to break the strip C out of contact with the remaining die elements and the supports E continue its upward travel and hold the strip at a point even higher than the maximum excursion of the element D. I center the strip in relation to die and punch by means of set screws or other adjusting mechanisms on the yieldingly mounted guides or supports.

In the form of punch and die herein shown, the portions which are forced out of the normal plane of the strip are all bent downwardly toward the die. It is therefore necessary to lift the strip above the die a distance greater than the length of the largest downward projection, namely the hook tongue.

In the method of forming chain herein described, the side bars of the chain are not deformed or bent until shortly before the link is severed from the chain stock. Therefore the stock throughout most of its excursion between the punch and die has straight edges, and can easily and efficiency be fed forwardly through the guides.

The strip metal stock, of which the links are formed, is a fibrous material, and of course tough and hard. In making links from it it is necessary not only to render easy the severing of the parts which have to be severed, and to make this severing possible without distortion of the stock, but also to limit the severing and to counteract the tendency for further and unintended tearing or severing, either during manufacture or during later use of the chain. To make the severing easy, the parts to be severed are initially scored. To prevent further unintended tearing the lines of score are terminated by indentations which break up the normal fibrous structure of the material. The major severing operations are performed, not by one impact, but by a succession of impacts. The distortion of the metal at any one point is reduced to a minimum, and sharp bends, or corners, where the material of the stock is compressed by bending, are provided with creases or indentations which serve to give space for the material compressed, for example along the pintle tongue and at the corners of pintle and hook tongues, where they are bent from the stock.

The successive steps of the operation are as follows:

1. The gripping step, the action of the opposed gripping pads, one fixed and one yielding, one on the punch and one on the die. These opposed pads grip the metal stock and prevent its longitudinal movement. Their action is important primarily during the initial feed of the stock through the press, and the chain forming process may be carried on without them, although under many conditions they are valuable.

2. The center of the link is next transversely scored as at $l^3$ to outline the separation between the opposed edges of hook and pintle tongues. In the mechanism herein shown this score is across the top of the stock, but of course the location of this and of the other score and punch marks herein described could be inverted. The opposite side of the stock is indented as at $l^2$, $l^2$, the punch marks indicating the corners of the future central aperture of the link, and breaking up the regular fibrous structure of the metal at those points.

3. As the strip moves forwardly one step, the same area is next operated upon by the opposed scoring knives $l^6$, $l^7$ which outline, upon the top and bottom of the link, the separation between hook tongue and the side bars. These scores do not extend as far as the transverse score $l^3$, but this is not necessary, since the transverse severing knife $L^5$ at the same time severs the stock along the score $l^3$ and bends back the pintle tongue and the end of the hook tongue, the scores $l^6$, $l^7$ reaching substantially to the point at which the hook tongue is separated from the side bars. The pintle tongue is bent about the bead $L^4$, which makes a transverse crease along the inside of the bend, and connects the already formed indentations $l^2$, $l^2$. Space inside the bend is thus provided to take up the compression of the metal when the pintle tongue is further bent, and any tendency of the pintle tongue to tear out at the corners is obviated by the indentations $l^2$, $l^2$.

4. At the next forward movement of the stock the top of the stock receives the impact of a transverse punch element $L^{11}$ aligned with the original separation between hook and pintle tongues. One side of this element further bends the pintle tongue, and bends it about a bead $L^{12}$, which further enlarges the groove or crease along the inside of its bend. The other side further bends the end of the hook tongue continuing its separation from the side bars, and gives to its end a curve, substantially concentric with the future arc of the finished hook. Meanwhile the bottom of the stock is punched as at $l^{10}$, $l^{10}$, the punchmarks closing the ends of the scores $l^6$, and serving to prevent the tendency of the link to tear out when the hook tongue is finally bent away from the stock.

5. At the next forward movement of the stock the hook tongue is operated upon by a punch element which completes its severance from the link side bars and bends it to the position $l^{16}$ in Figure 2. The previously made indentations $l^{10}$, which have broken up the fibrous structure of the corners of the link, prevent weakness and tearing at the base of the hook tongue.

6. At the next forward movement of the stock the downwardly depending pintle tongue drops over the corners of the die element $M^{20}$, and prevents longitudinal distortion of the entire strip to the rear of the point, or shortening of the strip or of the individual links by the impact and distorting action of the forming punches.

Up to this point the sides of the stock have been straight, since there has been no distortion of the side bars. Now, however, the line of separation of the two adjacent links is made along the score $l^{20}$ and the link thus separated, is bent to the position shown at the left end of the Figure 2. Meanwhile the hook and pintle bars are bent into the position shown at $m^6$, $m^7$ and the central aperture of the link adjacent the pintle bar is slightly widened as at $m^9$.

7. The link is now ready to be severed from the stock and at its next forward movement it is sheared along the score $l^{20}$ and is carried downwardly by the punch element $N^2$ toward the lower forming die. The hook tongue $m^1$, since it depends farther from the link than the pintle tongue, is the first to contact the die and is rolled around by the semi-cylindrical die surface $N^6$ into the form shown at $N^7$ in Figure 4. When the link has been carried so far down that the pintle tongue also contacts the die, it is bent into finished form. Since it is bent or compressed far more highly than the longer hook tongue, the creases or grooves along the inside of the bend of the pintle tongue are extremely important in preventing weakening of the pintle tongue, and the punch marks at the corners are vital in preventing strain upon and distortion of the metal at those points.

The pintle of the precedingly completed link is positioned within the arc of the hook tongue as it is being curled into final form, and it therefore curls about the pintle and passes through the central aperture of the preceding link. The pintle end of the link being somewhat widened, as at $m^9$, there is ample room for the hook tongue to pass therethrough. The link thus completed is drawn forwardly away from the end of the stock and at the next movement of the stock the succeeding link is fed forward ready for separation and final formation.

In the form shown in Figure 12 I have illustrated a means for minimizing the effect of the transverse scoring knife in breaking up and weakening the structure of the metal. I provide an opposed scoring knife just sufficient to break the surface of the lower side of the stock, and I position it between transverse hollows $T^1$ which give space for the metal depressed by the transverse scoring knife L³. Strain upon the metal is so far eliminated as to prevent any appreciable weakening of the fibers of the structure of the future link. I also indicate in Figure 12 the creasing element T² which scores or creases the inside of the bend of the future pintle tongue, making easier to bend it and enabling it to be bent with a substantially reduced strain upon and weakening of the fibrous structure of the metal. I may dispense with the prick punches, or I may move them a step forward on the die, as shown in Figure 12.

While I have illustrated an adequate and operative device, and a practical and efficient process, it will be realized that I do not wish to be limited to the specific details and steps shown, or to the specific order of steps. I wish my description to be taken rather as in a broad sense diagrammatic, and illustrative, since many changes in form and arrangement of steps and the parts used to accomplish the steps may be made without departing from the spirit of my invention.

I claim:

1. In a machine for making, from a continuous strip of sheet metal stock, chain links having pintles and hooks struck from the center of the link, comprising an opposed die and punch, having a plurality of elements positioned therein for progressive action upon the stock passing therebetween, longitudinal scoring knives adapted to score the link to outline the inner edges of the side bars, a knife element adapted transversely to sever the metal between said scores, means for indenting the link at the inside corners of the junction of the side bars and the hook end bar on the side of the stock from which the hook is bent, and means upon the punch adapted to contact the hook tongue and separate it from the side bars and bend it in relation to the link.

2. In a machine for making, from a continuous strip of sheet metal stock, chain links having pintles and hooks struck from the center of the link, comprising an opposed die and punch, having a plurality of elements positioned therein for progressive action upon the stock passing therebetween, means for indenting the link at the inside corners of the junction of the side bars and the pintle end bar on the side of the stock from which the hook is bent, longitudinal scoring knives adapted to score the blank to outline the inner edges of the side bars, a knife element operative on the face of the link opposite to the indenting means, adapted transversely to sever the metal between said scores, and to bend the pintle tongue from the side bars, and means adapted to contact the hook tongue and separate it from the side bars and to bend it in relation to the link.

3. In a machine for making, from a continuous strip of sheet metal stock, chain links having pintles and hooks struck from the center of the link, comprising an opposed die and punch, each having a plurality of elements positioned therein for progressive action upon the stock passing therebetween, means for indenting the link at the inside corners of the junction of the side bars and the pintle end bar, a scoring knife adapted transversely to score the link between the side bars, longitudinal scoring knives adapted to score the link to outline the inner edges of the side bars, a knife element, operative on the face of the link opposite to the indenting means, adapted to sever the metal along said transverse score, and to bend the pintle tongue from the side bars, means for indenting the link at the inside corners of the junction of the side bars and the hook end bar, and means upon the punch adapted to contact the hook tongue and separate it from the side bars and bend it in relation to the link.

4. In a machine for making, from a continuous strip of sheet metal stock, chain links having pintles and hooks struck from the center of the link, comprising an opposed die and punch each having a plurality of elements positioned therein for progressive action upon the stock passing therebetween, indenting means adapted to indent the link adjacent the inside corners of the junctions of the side bars and the end bars, transverse scoring means adapted to score the link between the side bars, longitudinal scoring knives adapted to score the link along the inner edges of the side bars, and die elements, operative upon the face of the link opposite the indenting means adapted to contact the hook and pintle tongues and separate them from each other and from the side bars and bend them in relation to the link.

5. In a machine for making, from a continuous strip of sheet metal stock, chain links having pintles and hooks struck from the center of the link, comprising an opposed die and punch, having a plurality of elements positioned therein for progressive action upon the stock passing therebetween, indenting means adapted to indent the link adjacent the inside corners of the junctions of the side bars and the end bars, longitudinal scoring knives adapted to score the link along the inner edges of the side bars, and elements, operative upon the face of the link opposite the indenting means, adapted to contact the hook and pintle tongues and separate them from each other and from the side bars, and bend them in relation to the link.

6. In a machine for making, from a continuous strip of sheet metal stock, chain links having pintles and hooks struck from the center of the link, comprising an opposed die and punch, having a plurality of elements positioned therein for progressive action upon the stock passing therebetween, indenting means adapted to indent the link adjacent the inside corners of the junctions of the side bars and the end bars, and elements, operative upon the face of the link opposite the indenting means, adapted to contact the hook and pintle tongues and separate them from each other and from the side bars and bend them in relation to the link.

7. In a machine for making, from a continuous strip of sheet metal stock, chain links having pintles and hooks struck from the center of the link, comprising an opposed die and punch, having a plurality of elements positioned therein for progressive action upon the stock passing therebetween, opposed stock gripping pads positioned upon punch and die adjacent to and on the feed side of the point of entry of the stock between the dies, adapted yieldingly to grip the stock prior to the forming engagement of the punch and die elements and to prevent longitudinal movement of the stock during the link forming impact.

8. In a machine for making, from a continuous strip of sheet metal stock, chain links having pintles and hooks struck from the center of the link, comprising an opposed die and punch, having a plurality of elements positioned therein for progressive action upon the stock passing therebetween, forming elements adapted to separate the hook and pintle tongues from each other and from the side bars, forming elements adapted to curl the end bars after such separation, an element adapted to shear the link from the stock after the end bars have been curled, opposed elements adapted yieldingly to engage the severed link and to hold it in contact with the punch, and opposed forming means adapted to bend the pintle and the hook tongues into final form after the severing of the link from the stock.

9. In a machine for making, from a continuous strip of sheet metal stock, chain links having pintles and hooks struck from the center of the link, comprising an opposed die and punch having a plurality of elements positioned therein for progressive action upon the stock passing therebetween, forming elements adapted to separate the hook and pintle tongues from each other and from the side bars, forming elements adapted to curl the end bars after such separation, a punch element adapted to shear the link from the stock after the end bars have been curled, means for yieldingly holding the severed link in contact with the punch, and forming means adapted to bend the pintle and the hook tongues into final form after the severing of the link from the stock, and guiding and supporting means adapted to hold the pintle of the link last formed within the periphery of the arc described by the hook tongue in the course of its formation.

10. In a machine for making, from a continuous strip of sheet metal stock, chain links having pintles and hooks struck from the center of the link, comprising an opposed die and punch, having a plurality of elements positioned therein for progressive action upon the stock passing therebetween, opposed forming elements adapted to separate the hook and pintle tongues from each other and from the side bars, forming elements adapted to curl the end bars after such separation, a punch element adapted to shear the link from the stock, after the end bars have been curled, yielding means for holding the severed link in contact with the punch, and opposed forming die elements positioned substantially below the plane of the remaining die elements adapted to bend the pintle and the hook tongues into final form after the severing of the link from the stock, in response to the downward travel of the severed link.

11. In a machine for making, from a continuous strip of sheet metal stock, chain links having pintles and hooks struck from the center of the link, comprising an opposed die and punch, having a plurality of elements positioned therein for progressive action upon the stock passing therebetween, opposed forming elements thereupon adapted to separate the hook and pintle tongues from each other and from the side bars, a punch element adapted to shear the link from the stock, means for yieldingly holding the severed link in contact with the punch, and opposed forming die elements positioned substantially below the plane of the lower die, adapted to bend the pintle and the hook tongues into final form after the severing of the link and the stock, in response to the downward travel of the severed link, and means for holding the pintle of the last link formed within the periphery of the arc described by the hook in the course of its formation.

12. In a machine for making, from a continuous strip of sheet metal stock, chain links having pintles and hooks struck from the center of the link, comprising an opposed die and punch having a plurality of elements positioned therein for progressive action upon the stock passing therebetween, means for initially transversely scoring the center of the link between the side bars; means for severing the center of the link along such score and tearing and rolling away from each other the opposed ends of the hook and pintle tongues, and for bending the pintle tongue from the link, and at the same time longitudinally scoring the link along the inside edge of the side bars; means for severing the hook tongue from the side bars, along the lines of score, and for bending it from the link; means for crimping the ends bars of the link after the separation of the tongues from the side bars is completed, and for transversely scoring the stock between adjacent links; means for shearing the link from the stock and for curling the pintle tongue into final position and curling the hook tongue about the pintle of the link precedingly formed.

13. In a machine for making, from a continuous strip of sheet metal stock, chain links having pintles and hooks struck from the center of the link, comprising an opposed die and punch, having a plurality of elements positioned therein for progressive action upon the stock passing therebetween, a transverse scoring knife adapted to score the center of the link, a severing knife adapted to sever the metal along such score and to bend the pintle tongue from the link, a creasing bead adapted to engage the pintle tongue and pintle end bar along the inside of the bend thus formed, a punch element adapted to separate the hook tongue from the side bars and to bend it from the blank.

14. In a machine for making, from a continuous strip of sheet metal stock, chain links having pintles and hooks struck from the center of the link, comprising an opposed die and punch, each having a plurality of elements positioned therein for progressive action upon the stock as it passes therebetween, means for rolling the hook of each link about the pintle of the previously completed link, and means for supporting the completed chain with the pintle of such last formed link in position to be surrounded by such hook, comprising a vertically movable, yieldingly supported guide for said chain.

15. In a machine for making, from a continuous strip of sheet metal stock, chain links having pintles and hooks struck from the center of the link, comprising an opposed die and punch, each having a plurality of elements positioned therealong for progressive action upon strip stock passing step by step therebetween, means for severing each link prior to its completion and for carrying it downwardly out of line with the die and for rolling its hook about the pintle of the link precedingly formed, and means for supporting the completed chain with the pintle of the last formed link in position to be surrounded by such hook, comprising a vertically movable carrier and means for maintaining it in substantially horizontal alignment with said link during its downward excursion.

16. In a machine for making, from a continuous strip of sheet metal stock, chain links having pintles and hooks struck from the center of the link, comprising an opposed die and punch, each having a plurality of elements positioned therealong for progressive action upon strip stock passing step by step therebetween, means for severing each link prior to its completion and for carrying it downwardly out of line with the die and for rolling its hook about the pintle of the link precedingly formed, and means for supporting the completed chain with the pintle of the last formed link in position to be surrounded by such hook, comprising a vertically movable carrier and means for maintaining it in substantially horizontal alignment with said link during its downward excursion, vertical guides for said carrier and yielding means for normally holding said carrier adjacent the upper portion of said guides, said punch being adapted to engage the carrier and thrust it downwardly along said guides.

17. In a machine for making, from a continuous strip of sheet metal stock, chain links having pintles and hooks struck from the center of the link, comprising an opposed die and punch, each having a plurality of elements positioned therein, for progressive action upon the stock passing therebetween, a plurality of members longitudinally spaced along punch and die in supporting and guiding contact with the stock between die and punch, and adapted to position the stock out of contact with either, intermediate the forming impacts of punch upon die.

18. In a machine for making, from a continuous strip of sheet metal stock, chain links having pintles and hooks struck from the center of the link, comprising an opposed die and punch, each having a plurality of elements positioned therein for progressive action upon the stock passing therebetween, a plurality of members longitudinally spaced along punch and die in supporting and guiding contact with the stock between die and punch, and adapted to position the stock out of contact with either, intermediate the forming impacts of punch upon die, said members being adapted to lift the stock from the die, and to guide it during its forward movement intermediate the forming impacts of the punch.

19. In a machine for making, from a continuous strip of sheet metal stock, chain links having pintles and hooks struck from the center of the link, comprising an opposed die and punch, each having a plurality of elements positioned therein for progressive action upon the stock passing therebetween, means for yieldingly positioning the stock between die and punch, and out of contact with either, intermediate the forming impacts, comprising a plurality of adjustable guides to engage and support the opposed edges of the stock, said guides being depressibly mounted on said die block.

20. In a machine for making, from a continuous strip of sheet metal stock, chain links having pintles and hooks struck from the center of the link, comprising an opposed die and punch, each having a plurality of elements positioned therein for progressive action upon the stock passing therebetween, means for yieldingly positioning the stock between die and punch, and out of contact with either intermediate the forming impacts, comprising a plurality of guides mounted adjacent the die, adapted adjustably to engage and support the opposed edges of the stock, and yielding means for moving said guides upwardly in relation to said die, intermediate the forming impacts.

21. In a machine for making, from a continuous strip of sheet metal stock, chain links having pintles and hooks struck from the center of the link, comprising an opposed die and punch, each having a plurality of elements positioned therein for progressive action upon the stock passing therebetween, means for yieldingly positioning the stock between die and punch, and out of contact with either, intermediate the forming impacts, comprising a plurality of guides adapted slidably to engage and support the opposed edges of the stock, and means for laterally adjusting the contact of said guides with the edges of the stock.

22. In a machine for making, from a continuous strip of sheet metal stock, chain links having pintles and hooks struck from the center of the link, comprising an opposed die and punch, having a plurality of elements positioned therein for progressive action upon the stock passing therebetween, means for yieldingly positioning the stock between die and punch, and out of contact with either, intermediate the forming impacts, comprising a plurality of guides adapted adjustably to engage and support the opposed edges of the stock, one pair of said guides being positioned adjacent the point of entry of the stock between the die and punch and another being positioned adjacent the opposite end of punch and die.

23. In a machine for making, from a continuous strip of sheet metal stock, chain links having pintles and hooks struck from the center of the link, comprising an opposed die and punch, each having a plurality of elements positioned therein for progressive action upon the stock passing therebetween, means for indenting the inner corners of the central aperture of the link on the side of the stock toward which the tongues are to be bent, and means for severing the hook and pintle tongues from each other and for bending them away from the side bars of the link.

24. In a machine for making, from a continuous strip of sheet metal stock, chain links having pintles and hooks struck from the center of the link, comprising an opposed die and punch, each having a plurality of elements positioned therein for progressive action upon the stock passing therebetween, means for indenting the inner corners of the central aperture of the link on the side of the stock toward which the tongues are to be bent, means for severing the hook and pintle tongues from each other and for bending them away from the side bars of the link, and means for subsequently curling the end bars of the link.

25. In a machine for making, from a continuous strip of sheet metal stock, chain links having pintles and hooks struck from the center of the link, comprising an opposed die and punch, having a plurality of elements positioned therein, for progressive action upon the stock passing therebetween, a transverse scoring knife adapted to score the top of the stock, an opposed transverse scoring knife adapted to score the bottom of the stock, the die element being shaped with a plurality of transverse depressions adjacent said scoring knives, and adapted to receive the material displaced by the scoring operation.

26. In a machine for making, from a continuous strip of sheet metal stock, chain links having pintles and hooks struck from the center of the link, comprising an opposed die and punch, having a plurality of elements positioned therein, for progressive action upon the stock passing therebetween, a transverse scoring knife adapted to score the top of the stock, an opposed transverse scoring knife adapted to score the bottom of the stock, the die element being shaped with a plurality of transverse depressions adjacent said scoring knives, and adapted to receive the material displaced by the scoring operation, and an adjacent transverse scoring knife adapted to score the inside of the bend of the pintle tongue.

27. In a machine for manufacturing chain from strip stock, comprising an opposed die and punch, and means for passing the stock therebetween, means positioned intermediate the ends of the die for lifting the chain stock from the die and for suspending it between said die and punch and out of contact with either, intermediate the forming impacts and for guiding it against lateral movement, while permitting its forward movement intermediate the forming impacts.

28. In a machine for manufacturing chain from strip stock, comprising an opposed die and punch, and means for passing the stock therebetween, means for lifting the chain stock from the die and for holding it between said die and punch and out of contact with either, intermediate the forming impacts, and means for initially releasing the stock from the die.

29. In a machine for manufacturing chain from strip stock, comprising an opposed die and punch, and means for passing the stock therebetween, means for lifting the chain stock from the die and for holding it between said die and punch and out of contact with either, intermediate the forming impacts, and means for initially releasing the stock from the die, comprising a yieldingly mounted die element and yielding means for thrusting it upwardly above the normal level of the remaining die elements, upon recession of the punch.

30. In a machine for manufacturing chain from strip stock comprising opposed die and punch members, and means for passing strip stock therebetween, means for guiding said strip between and out of contact with said die and punch member, between the forming impacts, comprising a pair of strip supporting elements adapted slidably to support the edges of the strip, and means for lifting them and thereby holding the strip normally out of contact with the punch and die when the punch and die are separated.

31. In a machine for manufacturing chain from strip stock comprising opposed die and punch members, and means for passing strip stock therebetween, means for guiding said strip between and out of contact with said die and punch member, between the forming impacts, comprising a pair of strip supporting elements, and yielding means for holding them and the strip normally out of contact with the punch and die when the punch and die are separated, said strip supporting elements including laterally adjustable strip edge engaging members.

32. In a machine for manufacturing chain from strip stock comprising an opposed die and punch, each having a plurality of elements positioned thereupon for progressive action upon the stock passing therebetween, means for positioning the stock between die and punch and out of contact with either, between the forming impacts, comprising a plurality of longitudinal adjustable guides to engage and support the opposed edges of the stock, said guides being depressibly mounted on said die block, the die and punch elements intermediate said guides being adapted to operate only upon the center of the links and to leave the edges of the stock unbent.

33. In a machine for making, from a continuous strip of sheet metal stock, chain links having pintles and hooks struck from the center of the link, comprising an opposed die and punch, each having a plurality of elements positioned therein for progressive action upon the stock passing therebetween, longitudinal scoring members adapted to score the link to outline the inner edges of the side bars, a transverse severing member adapted to separate the opposed ends of the hook and pintle tongues of each blank and to bend them in the same direction away from the flat stock of the blank, a plurality of shearing members adapted to operate successively on the hook tongue and progressively to sever it from the side bars, each such member being adapted to bend the hook tongue in the same direction from the stock as the initial bending of the end thereof, the opposed punch and die elements being adapted to maintain the side bars of the link blank unbent until the movement of the die next after the severing of the hook tongue from the side bars is completed.

34. In a machine for making, from a continuous strip of sheet metal stock, chain links having pintles and hooks struck from the center of the link, comprising an opposed die and punch, each having a plurality of elements positioned therein for progressive action upon the stock passing therebetween, a transverse scoring member adapted initially to score the link along the line of separation between the ends of the hook and pintle tongues, longitudinal scoring members adapted to score the link to outline the inner edges of the side bars, a transverse severing member adapted subsequently to tear apart, along the transverse score the opposed ends of the hook and pintle tongues of each blank and to roll them apart and to bend them in the same direction away from the flat stock of the blank, a plurality of shearing members adapted to operate successively on the hook tongue and progressively to sever it from the side bars, each such member being adapted to bend the hook tongue in the same direction from the stock as the initial bending of the end thereof, the opposed punch and die elements being adapted to maintain the end bars of the link substantially flat until the movement of the die next after the severing of the hook tongues from the side bars is completed.

35. In a machine for making, from a continuous strip of sheet metal stock, chain links having pintles and hooks struck from the center of the link, comprising an opposed die and punch, each having a plurality of elements positioned therein for progressive action upon the stock passing therebetween, members adapted to sever the ends of the hook and pintle tongues and to bend said tongues away from the blank, means for severing the uncompleted link from the stock and for conveying it out of the general horizontal plane of the die, and means for completing the link after it is so conveyed and for attaching it to the last link previously completed.

36. In a machine for making, from a continuous strip of sheet metal stock, chain links having pintles and hooks struck from the center of the link, comprising an opposed die and punch, each having a plurality of elements positioned therein for progressive action upon the stock passing therebetween, members adapted to sever the ends of the hook and pintle tongues and to bend said tongues away from the blank, means for severing the uncompleted link from the stock and for conveying it out of the general horizontal plane of the die, and means for completing the link after it is so conveyed, and for attaching it to the chain, comprising opposed die and punch elements adapted to curl the hook and pintle tongues into final form, and means for positioning the pintle tongue of the last formed link within the periphery of the hook tongue of the succeeding link, as it is curled into final form.

37. In a machine for making, from a continuous strip of sheet metal stock, chain links having pintles and hooks struck from the center of the link, comprising an opposed die and punch, each having a plurality of elements positioned therein for progressive action upon the stock passing therebetween, a plurality of opposed punch and die members adapted to outline the future hooks and pintles and to separate them from each other and from the side bars, means for maintaining the side bars and end bars in the plane of the stock until the separation of said hooks and pintles from the side bars is completed, and opposed punch and die elements adapted to crimp the end bars only after such separation is completed.

38. In a machine for making, from a continuous strip of sheet metal stock, chain links having pintles and hooks struck from the center of the link, comprising an opposed die and punch, each having a plurality of elements positioned therein for progressive action upon the stock as it passes therebetween, means for rolling the hook of each link about the pintle of the previously completed link, and means for supporting the completed chain with the pintle of such last formed link in position to be surrounded by such hook, comprising a vertically movable, guide for said chain.

39. In a machine for making, from a continuous strip of sheet metal stock, chain links having pintles and hooks struck from the center of the link, comprising an opposed die and punch, each having a plurality of elements positioned therein for progressive action upon the stock passing therebetween, members adapted to separate the hook and pintle tongues from the link and to bend them away from it, means for severing the uncompleted link from the stock, means for rolling the hook tongue of the link about the pintle of the precedingly formed link, and a vertically movable guide adapted to hold said last formed link in position during such rolling.

40. In a machine for making, from a continuous strip of sheet metal stock, chain links having pintles and hooks struck from the center of the link, comprising an opposed die and punch, each having a plurality of elements positioned therein for progressive action upon the stock passing therebetween, members adapted to separate the hook and pintle tongues from the link and to bend them away from it, means for severing the uncompleted link from the stock, means for rolling the hook tongue of the link about the pintle of the precedingly formed link, and a vertically movable guide adapted to hold said last formed link in position during such rolling, and yielding means adapted normally to move said guide upwardly.

Signed at Chicago, county of Cook and State of Illinois, this 29th day of April, 1924.

RAYMOND W. DULL.